United States Patent [19]

Martinez et al.

[11] Patent Number: 5,080,635
[45] Date of Patent: Jan. 14, 1992

[54] ELECTROMECHANICAL DRIVE DEVICE EQUIPPED WITH SAFETY MEANS

[75] Inventors: Yves Martinez, Puteaux; Jacques Neuvessel, Neuilly sur Seine, both of France

[73] Assignees: Aviac, Mantes Laville; Creusot Loire Industrie, Puteaux, both of France

[21] Appl. No.: 689,174

[22] Filed: Apr. 23, 1991

[30] Foreign Application Priority Data

Apr. 27, 1990 [FR] France .................. 90 05440

[51] Int. Cl.$^5$ .................................. F16H 1/32
[52] U.S. Cl. ............................ 475/5; 475/151
[58] Field of Search .................. 475/5, 151, 152, 154

[56] References Cited

U.S. PATENT DOCUMENTS

| | | | |
|---|---|---|---|
| 2,220,983 | 11/1940 | Waters | 475/5 |
| 2,330,985 | 10/1943 | Meyer | 475/5 X |
| 3,769,856 | 11/1973 | Casey | 475/5 |
| 3,986,412 | 10/1976 | Farley | 74/661 |
| 4,090,416 | 5/1978 | Hicks | 475/5 |
| 4,411,171 | 10/1983 | Figla | 475/5 |
| 4,760,989 | 8/1988 | Elliott et al. | 251/129.03 |

FOREIGN PATENT DOCUMENTS 1465469  1/1967  France .
2216980 10/1989  United Kingdom .

*Primary Examiner*—Dirk Wright
*Attorney, Agent, or Firm*—Cushman, Darby & Cushman

[57] ABSTRACT

This device, comprising a main motor (1), a transmission mechanism with an epicylic gear train comprising an input member (3) driven by the main motor, an output member (5), and a reaction member (7) locked in rotation when the main motor is operating, is characterised in that it furthermore comprises an auxiliary motor (10), a speed-reduction mechanism (11) with at least one stage, comprising an input member (13) driven by the auxiliary motor, and an output member (19) adapted in order to drive in rotation the reaction member (7) of the epicylic gear train, means (21, 22) being provided in order to release the reaction member and in order to lock in rotation the input member of the epicyclic gear train when the main motor is at a standstill and when the auxiliary motor must operate.

9 Claims, 1 Drawing Sheet

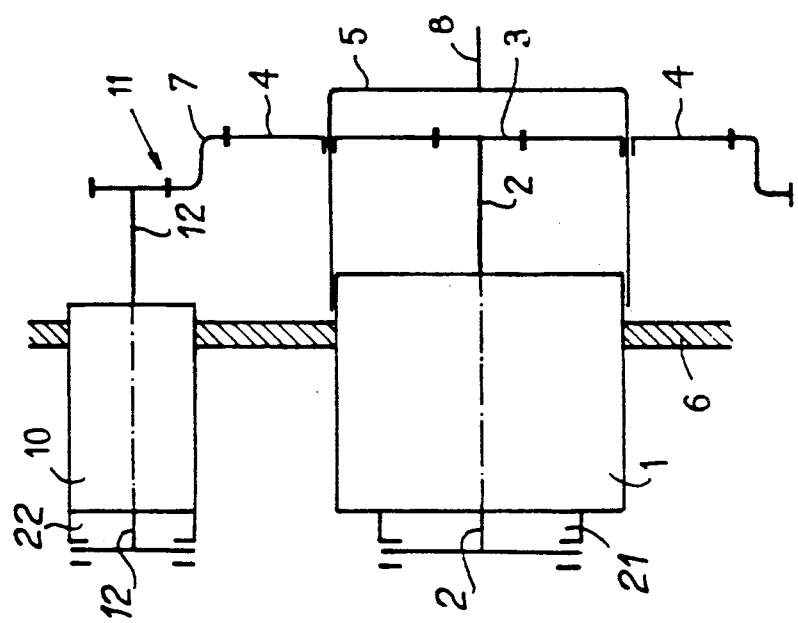
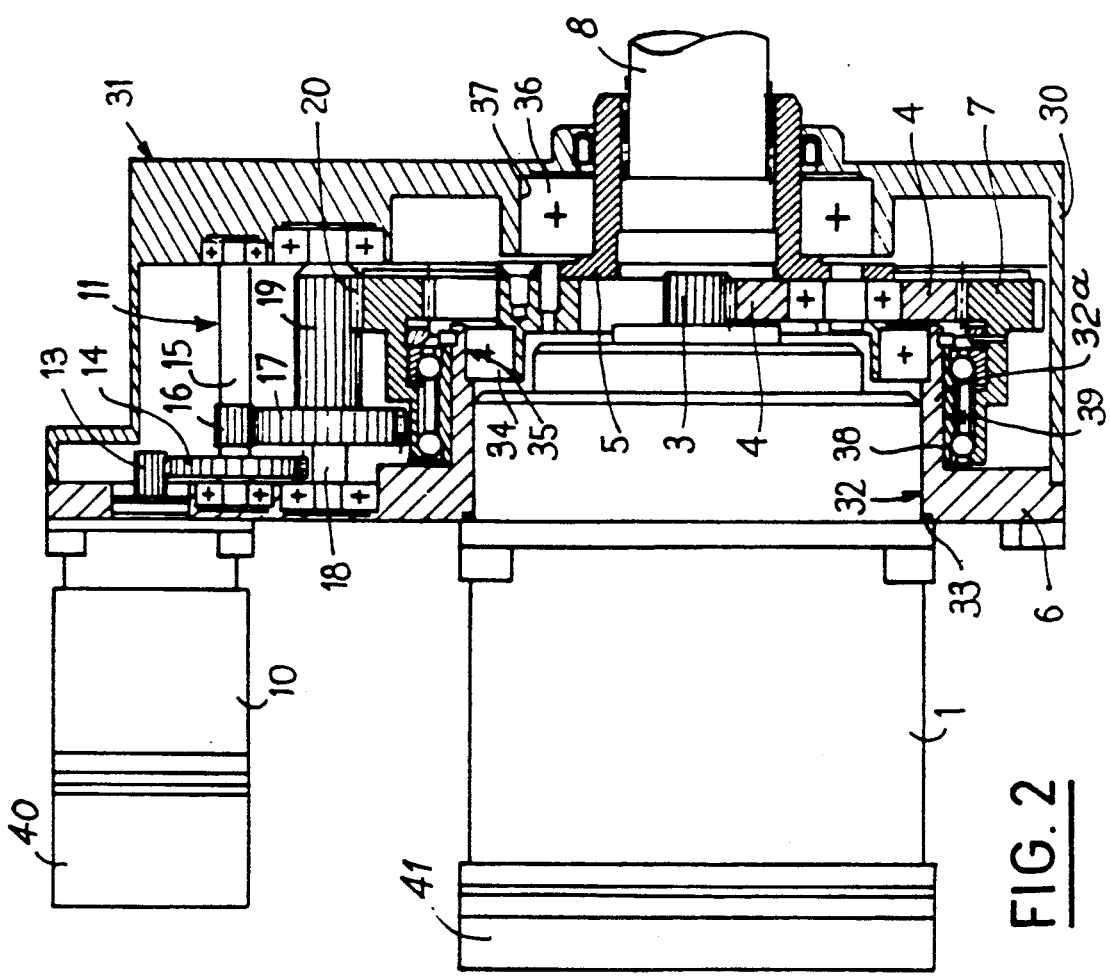

ELECTROMECHANICAL DRIVE DEVICE EQUIPPED WITH SAFETY MEANS

The present invention relates to an electromechanical drive device which can be used, in particular, in equipment or installations whose conditions of use entail the presence of safety means.

This device is of the type comprising a main motor and a transmission mechanism with an epicyclic gear train comprising an input member driven by the main motor, an output member, and a reaction member which is locked in rotation when the main motor is operating.

In such a known drive device, the input member of the epicyclic transmission mechanism is a sun gear, the output member is a planet carrier and the reaction member is an internal ring gear, this ring being integral with a casing containing the epicylic gear train and on which the drive motor is mounted.

In technical fields where the uncontrolled or accidental shutting down of the drive motor requires rapid maintenance, a manual drive means with a crank is generally provided.

The operative must then provide, when the motor is faulty, work equivalent to that required from the drive motor. The power which he can provide remains, however, limited to one hundredth of a watt, for a relatively short period of time.

Furthermore, the manual drive means with a crank is necessarily situated near the faulty device, which obliges an operative to move around and in places which are sometimes far apart or accessible only with difficulty.

The object of the invention is to overcome these various disadvantages and to provide an electromechanical drive device equipped with safety means which are efficient and easy to employ.

To this end, the subject of the invention is an electromechanical drive device comprising a main motor, a transmission mechanism with an epicylic gear train comprising an input member driven by the main motor, an output member, and a reaction member which is locked in rotation when the main motor is operating, characterised in that it comprises an auxiliary motor, a speed-reduction mechanism with at least one stage, comprising an input member driven by the auxiliary motor, and an output member adapted in order to drive in rotation the reaction member of the epicyclic gear train, means being provided in order to release the reaction member and in order to lock in rotation the input member of the epicyclic gear train when the main motor is at a standstill and when the auxiliary motor must operate.

According to other features:
- the input member of the epicyclic gear train is a sun gear, the output member is a planet-carrying cage, and the reaction member is an internal ring gear;
- the ring furthermore comprises an external toothing with which meshes an output member of the speed-reduction mechanism;
- the auxiliary motor is supplied by a dynamo;
- the auxiliary motor is supplied by a safety current source separate from the source supplying the main motor.

The invention will be better understood with the aid of the following description, given purely by way of example and made with reference to the attached drawings, in which:

FIG. 1 is a skeleton diagram of a double-input drive device according to the invention;

FIG. 2 shows an illustrative embodiment of such a device.

A diagram of a drive device can be seen in FIG. 1 which can be used, for example, for a door with electromechanical opening and closing, and which comprises a main electric motor 1, the output shaft 2 of which carries a sun gear 3 forming part of an epicyclic gear train.

The sun gear 3 meshes with at least two planet pinions 4 carried by a cage 5 forming a planet carrier and mounted in rotation with respect to a support 6 of the main motor. The planets 4 mesh with an internal ring gear 7 which constitutes a reaction member and is locked in rotation during the normal use of the device, in other words when the main motor 1 is operating. The cage 5 is integrally connected to a shaft 8 constituting the output member of the drive device and connected to a receiving member (not shown).

According to the invention, a safety drive device is provided which comprises an auxiliary motor 10 which is also mounted on the support 6 and is arranged so as to be able to drive in rotation the ring 7 via a speed-reduction mechanism 11.

To this end (FIG. 2), the shaft 12 of the auxiliary motor carries a pinion 13 which engages with a pinion 14 carried by a first intermediate shaft 15. This intermediate shaft carries a second pinion 16 which itself engages with a pinion 17 carried by a second intermediate shaft 18. Lastly, a final pinion 19 carried by the second intermediate shaft meshes with an external toothing 20 carried by the ring 7.

According to the diagram in FIG. 1, a first brake 21 is also provided which makes it possible to lock in rotation the shaft 2 of the main motor 1, and a second brake 22 is provided which is adapted in order to be able to lock in rotation the shaft 12 of the auxiliary motor 10.

The main and auxiliary motors can be electric motors of any appropriate type, and the brakes used for locking the shafts of these motors can be, for example, electromagnetically controlled disc brakes, it being possible, however, to use any other appropriate type of brake. The auxiliary motor can be supplied by a dynamo, by a safety current source or by any other appropriate source, separate from or added to the source supplying the main motor.

The main components described with respect to the diagram in FIG. 1 also appear in FIG. 2. The only additional point which needs to be made is that in the embodiment in this FIG. 2, the main motor and the auxiliary motor are mounted in parallel on the support 6 which closes the body 30 of a casing 31 inside which the epicyclic gear train mechanism and the speed-reduction mechanism are arranged. To be more precise, the main motor 1 is accommodated in a cylindrical housing 32 defined by a part 32a of the support 6 which extends inside the casing body 30, and it bears against a shoulder 33 of the support. The epicyclic gear train comprises three planets 4 arranged in a triangle in the cage 5 which carries the output shaft 8.

This assembly formed by the cage and the output shaft is mounted so as to rotate freely on two bearings formed, on the one hand, from a ball bearing 34 accommodated in the end 35 of the housing 32 of the support 6 and, on the other hand, from another ball bearing 36 accommodated in a housing 37 of the casing body 30.

The ring gear 7 is carried by a roller bearing 38 with two rows of balls, the inner hoop of which fits against the outer surface 39 of the part 32a of the support.

The brakes making it possible to lock in rotation the shaft of the main motor and the shaft of the auxiliary motor are protected by caps 40, 41.

Such a device operates as follows:

During normal operation, it is the main motor which drives the shaft 8, via the transmission mechanism with an epicyclic gear train. The ring 7 then serves as a reaction member, being locked in rotation by the speed-reduction mechanism and the brake 22 acting on the shaft 12 of the auxiliary motor.

If, for any reason, the main motor stops, the auxiliary motor is started up either manually or automatically, and the brake 21 is actuated in order to lock the shaft 2 of the main motor. The output shaft 8 is then driven from the auxiliary motor, via the speed-reduction mechanism and the planetary gear train, the sun gear 3 of which becomes the fixed reaction member, whilst the ring 7 constitutes the input member.

In another example of use, the device may be suited to act as a displacement and safety means for a lift or other lifting appliances.

The problem mentioned at the beginning of this document is thus overcome in an efficient manner and the means employed are simple, reliable and compact.

We claim:

1. Electromechanical drive device comprising a main motor (1), a transmission mechanism with an epicyclic gear train comprising an input member (3) driven by the main motor, an output member (5), and a reaction member (7) which is locked in rotation when the main motor is operating, characterised in that it comprises an auxiliary motor (10), a speed-reduction mechanism (11) with at least one stage, comprising an input member (13) driven by the auxiliary motor, and an output member (19) adapted in order to drive in rotation the reaction member (7) of the epicyclic gear train, means (21, 22) being provided in order to release the reaction member and in order to lock in rotation the input member of the epicyclic gear train when the main motor is at a standstill and when the auxiliary motor must operate.

2. Drive device according to claim 1, characterised in that the said means comprise a brake (21) associated with the shaft (2) of the main motor, and a brake (22) associated with one of the members constituting the kinematic chain between the auxiliary motor (10) and the reaction member (7) of the epicyclic gear train.

3. Drive device according to claim 1, characterised in that the input member of the epicyclic gear train is a sun gear (3), the output member is a planet-carrying cage (5), and the reaction member is an internal ring gear (7).

4. Drive device according to claim 3, characterised in that the ring gear (7) furthermore comprises an outer toothing (20) with which meshes an output member (19) of the speed-reduction mechanism (11).

5. Drive device according to claim 1, characterised in that the auxiliary motor (10) is supplied by a dynamo.

6. Drive device according to claim 1, characterised in that the auxiliary motor (10) is supplied by a safety current source separate from the source supplying the main motor (1).

7. Drive device according to claim 1, characterised in that the main motor (1) and the auxiliary motor (10) are arranged in parallel and are mounted on a support (6) forming part of a casing (31) inside which are accommodated the epicyclic gear train mechanism (3, 4, 5, 7) and the speed-reduction mechanism (11).

8. Drive device according to claim 7, characterised in that the epicyclic gear train comprises planets (4) carried by a cage (5) connected to rotate with an output shaft (8), the assembly formed by the cage and the output shaft being mounted so as to rotate in two bearings, one (34) of which is accommodated in a housing (35) of the support (6), and the other (36) of which is accommodated in a housing (37) of the casing (30).

9. Drive device according to claim 7, characterised in that the epicyclic train comprises a ring gear (7) which is carried by a roller bearing (38) comprising an inner hoop carried by a shoulder (39) of the support (6).

* * * * *